Nov. 15, 1960  J. F. MORSE  2,960,199
SHIFTING ARM FOR SINGLE LEVER ENGINE CONTROL
Filed May 23, 1958  2 Sheets-Sheet 1

INVENTOR.
JOHN F. MORSE
BY Ely, Frye & Hamilton
ATTORNEYS

Nov. 15, 1960        J. F. MORSE        2,960,199
SHIFTING ARM FOR SINGLE LEVER ENGINE CONTROL
Filed May 23, 1958        2 Sheets-Sheet 2
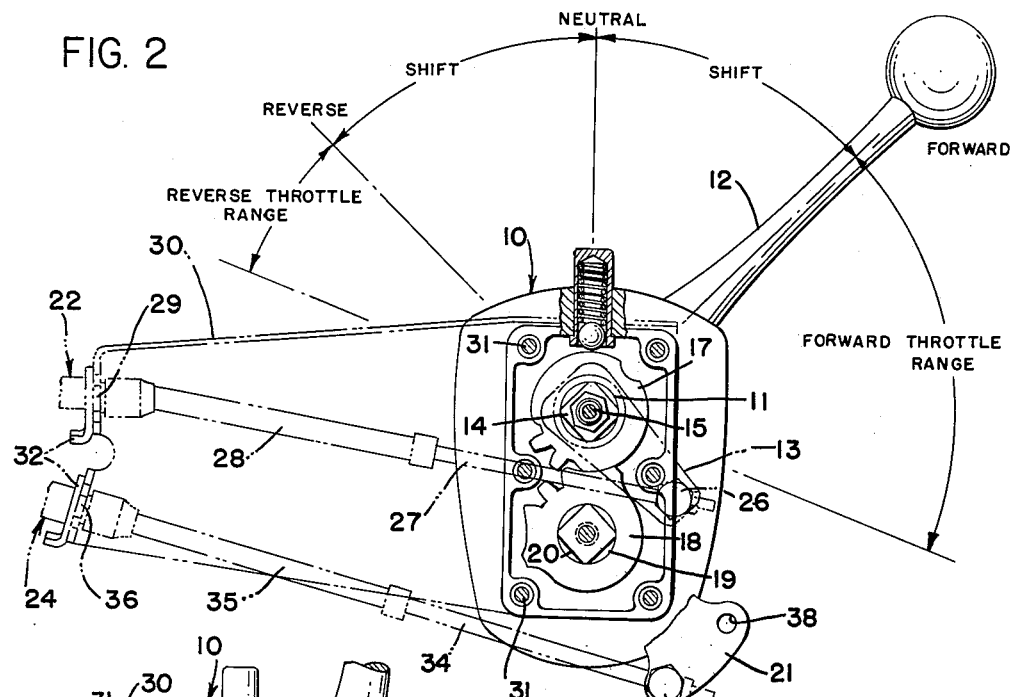
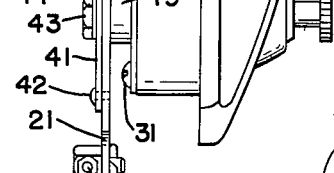
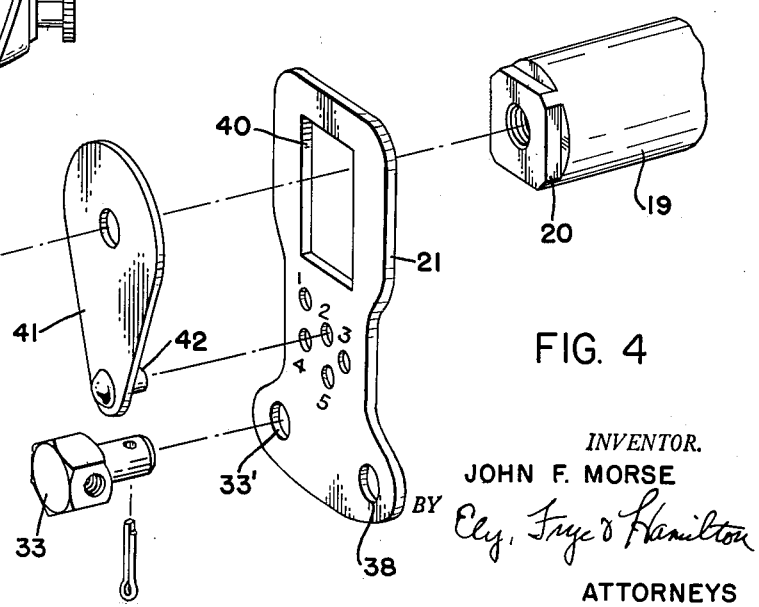
INVENTOR.
JOHN F. MORSE
ATTORNEYS United States Patent Office 2,960,199
Patented Nov. 15, 1960

2,960,199

SHIFTING ARM FOR SINGLE LEVER ENGINE CONTROL

John F. Morse, 21 Clinton St., Hudson, Ohio

Filed May 23, 1958, Ser. No. 737,404

3 Claims. (Cl. 192—.098)

The invention relates generally to remote controls for marine engines, and more particularly to a single lever control for an outboard engine.

The shift lever or clutch-engaging lever on a conventional outboard engine moves a predetermined distance from full forward to full reverse positions, and while recent models have standardized this distance to 2¾ inches, in many older models this distance varies. In a single lever control unit, travel of the shifting arm is fixed by the gear ratio with the throttle arm, and this travel must be completed before the control lever enters the throttle range. The shift lever usually swings through about 90° but the effective length of this travel often does not correspond exactly with the travel of the shift lever on the engine.

If the full travel of the control shift arm moves the engine shift lever less than its full shifting distance, the engine clutch may not be fully engaged when the throttle starts to advance, and damage to the clutch parts may result. If the engine shift lever is moved more than its full shifting distance and the engine has stops limiting movement of the clutch parts, binding of the gears and moving parts in the control unit may result because movement of the control shift lever is restrained before reaching its 45° position in either direction. On engines which do not have such stops the excessive movement of the engine shift lever will strain and damage the clutch parts.

The primary object of the present invention is to provide an adjustable shift arm for conforming the stroke of the shifting lever on a single lever control unit to the stroke of the engine shift lever to which it is connected.

Another object is to provide an adjustable shift arm which has a plurality of definite adjusted positions conforming selectively to the stroke of the shift lever on various engines.

A further object is to provide an adjustable shift arm which is simple in construction and which is easily adjusted to conform to the stroke of the engine shift lever without requiring special skill.

These objects and others which will appear from the following description are attained by the improvements comprising the present invention, a preferred embodiment of which is shown in the accompanying drawings and described herein.

The improved adjustable shift arm is non-rotatively secured on a squared end of its shaft and is slotted to move radially of the shaft for varying the radius of the arm to vary its stroke. A separate gauge plate may be mounted on the shaft and provided with a pin for registering selectively with a series of holes calculated to set the shift arm at predetermined radii.

Referring to the drawings:

Fig. 2 is a rear elevation of the control unit with parts removed and broken away and the control lever moved forward to enter the throttle range.

Fig. 3 is a front end elevation as on line 3—3 of Fig. 1.

Fig. 4 is an exploded perspective view of the parts comprising the improved adjustable shift arm.

Figure 1:
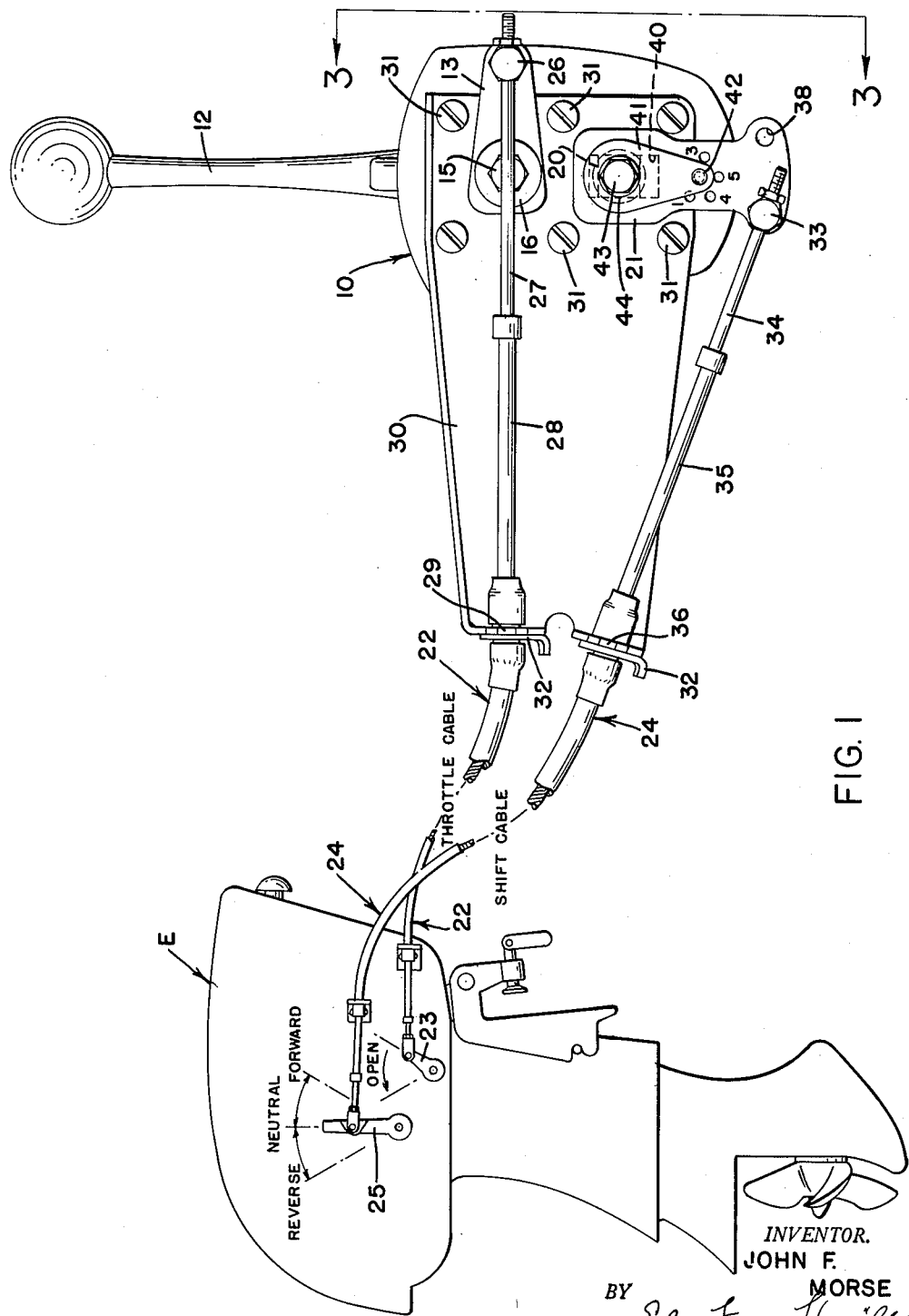
Fig. 1 is an elevation with parts broken away, showing the rear side of a control unit in neutral position embodying the invention, and operatively connected to the throttle and shift levers of an outboard engine.

In the drawings, the control unit is shown operatively connected to the outboard engine by means of push-pull cables, but it will be understood that other motion transfer means such as linkages could be employed within the scope of the present invention.

The housing of the control unit is indicated as a whole at 10 and has a throttle arm shaft 11 journaled therein and projecting rearwardly therefrom. The single control lever 12 is keyed on the front end of shaft 11 in any suitable manner. A throttle arm 13 is non-rotatively secured on a squared portion 14 of the shaft by a nut 15 and washer 16. An interrupted gear 17 keyed on the shaft 11 meshes with an interrupted gear 18 keyed on a shaft 19 also journaled in the housing 10. The shaft 19 has a rearwardly projecting squared end 20 on which the shifting arm 21 of the control is non-rotatively mounted.

The gears 17 and 18 may have the same pitch as shown, in which case a 45° movement of the control lever 12 and throttle arm 13 in either direction rotates the shifting arm 21 through 45° in the opposite direction. However, the relative pitches of the two gears may be changed as desired.

The throttle arm is connected by a push-pull cable 22 to the usual throttle lever 23 of the outboard engine E, and the shifting arm 21 is connected by a push-pull cable 24 to the usual shift lever or clutch lever 25. These cables are of the "swivel-end" type in which one end of the cable casing or sheath is rigidly mounted on the control unit, and an extension of the cable swivels to compensate for the arcuate motion of the throttle and shifting arms.

When the gear 17 is rotated beyond the 45° movement in either direction, the gear segment on gear 17 becomes unmeshed from the gear segment on gear 18, as indicated in Fig. 2, so that the shifting arm remains at its 45° position. However, one of the adjacent arcuate faces on gear 18 engages the circular edge of gear 17 as it continues to rotate, so that the shifting arm is maintained in its 45° position while the throttle is advanced.

The outer end of throttle arm 13 has a swivel connection 26 with the end of a push rod 27 which telescopes within a sleeve 28 and is connected to the core of cable 22, and the opposite end of the sleeve has a swivel connection in a mounting bushing 29 which is mounted in the end flange of a cable mounting plate 30 attached to the rear surface of the control unit by screws 31. The cable sheath of cable 22 is secured to the bushing 29 by a clip 32.

As shown, the throttle arm extends forwardly of the shaft 11 in neutral position so that rotation of the shaft in either direction exerts a push on the push rod which is transmitted by the core of the cable to push open the throttle lever 23. By reversing the position of the throttle arm it can be attached to pull rod for operating a pull-open throttle.

Similarly, the outer end of shifting arm 21 has a swivel connection 33 with the end of a push rod 34 which telescopes within a sleeve 35, the opposite end of which has a swivel connection with a mounting bushing 36 mounted in the end flange of cable mounting plate 30. The cable sheath of cable 24 is secured to bushing 36 by a clip 32.

The operation of the engine throttle and shift levers by the interrupted gears and push-pull cables is well known and per se forms no part of the present invention.

The shifting lever arm 21 of the control unit is preferably widened at its outer end and has a hole 33' for connection with the swivel 33, so that the angle between the push rod 34 and the radius from shaft 20 to swivel 33 approaches a right angle. A hole 38 is provided on the opposite side of the arm for attaching the swivel when the arm is used on a control unit of the opposite hand.

As best shown in Fig. 4, the arm 21 has a rectangular opening 40 at its inner end for fitting over the squared end 20 of shaft 19. The width of the opening is such as to fit the squared portion 20 to key the arm on the shaft, and the length of the opening allows sliding of the arm radially of the shaft to vary its effective radial length. In order to set the arm selectively at predetermined lengths, the arm is provided with a series of holes numbered 1–5, and a gage plate 41 mounted on the axis of shaft 19 has a pin 42 at its outer end for registering with and fitting into one of said numbered holes. The gage plate is pivoted on the shaft axis by a screw 43 and washer 44, and the gage plate also serves to secure the arm 21 on the squared portion 20 of the shaft 19.

The register pin holes 1–5 are located at predetermined radial distances from the shaft axis calculated so that when the pin 42 is inserted selectively therein by sliding the arm radially on the shaft and slightly rotating the gage plate, each register hole corresponds to the required stroke or travel of the shift arm for the engine shift lever stroke of a certain known type of engine. For example, the number 2 hole corresponds to a stroke of 2¾ inches which is the O.B.C. standard on 1958 outboard motors.

The other register holes correspond to other predetermined length strokes on other types of motors as follows:

| Stroke: | Register Hole No. |
|---|---|
| 2⅞" | 1 |
| 2¾" | 2 |
| 2⅝" | 3 |
| 2½" | 4 |
| 2⅜" | 5 |

Since the intervals between the register holes 1–5 are very small, the holes are spaced apart laterally as well as radially, which necessitates rotating the gage on the shaft axis when changing from one hole to another.

When installing the improved control unit on a boat, the travel or stroke of the shift lever on the outboard engine is first determined, and then by loosening screw 43 and sliding the arm 21 radially on the shaft 19, the pin 42 may be made to register with the proper register hole corresponding to the stroke of the engine shift lever.

The improved adjustable shifting lever provides for conforming the stroke of the shift lever arm on the control exactly to the stroke of the engine shift lever, so that the single lever control completes the shift without causing overtravel of the engine shift lever before entering the throttle range. The adjustment is easily made by unskilled persons because definite adjusted positions are predetermined and marked.

Obviously, modifications and changes in details of construction may be made within the scope of the invention defined in the appended claims.

What is claimed is:

1. In a single lever outboard engine control unit having a throttle control shaft and a clutch control shaft operatively connected thereto for rotation only during the first part of rotation of the throttle control shaft in either direction from neutral, said shafts being adapted for operative connection to the throttle lever and clutch shift lever of the engine, the improvement comprising means for adjusting the stroke of the clutch control shaft to conform it selectively to a plurality of predetermined strokes of the shift levers of various engines, said means including a clutch control arm for operative connection to the engine clutch shift lever, a squared end on said clutch control shaft, said arm having an elongated slot slidable radially on said squared end, said arm having a series of laterally spaced register pin holes located at predetermined different radial distances from said shaft, and a gage plate mounted on the axis of said shaft and having a register pin at its outer end for selective insertion in said pin holes.

2. In a single lever outboard engine control unit having a throttle control shaft and a clutch control shaft operatively connected thereto for rotation only during the first part of rotation of the throttle control shaft in either direction from neutral, said shafts being adapted for operative connection to the throttle lever and clutch shift lever of the engine, the improvement comprising means for adjusting the stroke of the clutch control shaft to conform it selectively to a plurality of predetermined strokes of the shift levers of various engines, said means including a clutch control arm for operative connection to the engine clutch shift lever, a squared end on said clutch control shaft, said arm having an elongated slot slidable radially on said squared end, to vary the radial length of said arm and a gage plate mounted on said clutch control shaft and adapted for cooperative engagement with said clutch control arm selectively at a plurality of radial positions of the arm.

3. In a single lever outboard engine control unit having a throttle control shaft and a clutch control shaft operatively connected thereto for rotation only during the first part of rotation of the throttle control shaft in either direction from neutral, said shafts being adapted for operative connection to the throttle lever and clutch shift lever of the engine, the improvement comprising means for adjusting the stroke of the clutch control shaft to conform it selectively to a plurality of predetermined strokes of the shift levers of various engines, said means including a clutch control arm for operative connection to the engine clutch shift lever, said arm being keyed on said clutch control shaft and slidable radially thereof, said arm having a series of laterally spaced register pin holes located at predetermined different radial distances from said shaft, and a gage plate pivoted on the axis of said shaft and having a register pin at its outer end for selective insertion in said pin holes.

References Cited in the file of this patent

UNITED STATES PATENTS

| 1,165,080 | Elliot | Dec. 21, 1915 |
| 2,702,615 | Morse | Feb. 22, 1955 |
| 2,759,578 | Manzolillo | Aug. 21, 1956 |
| 2,853,255 | Rasmussen et al. | Sept. 23, 1958 |

FOREIGN PATENTS

| 102,353 | Great Britain | Nov. 30, 1916 |
| 463,963 | France | Dec. 31, 1913 |
| 898,779 | France | July 17, 1944 |